United States Patent
Lee et al.

(10) Patent No.: US 8,927,163 B2
(45) Date of Patent: Jan. 6, 2015

(54) APPARATUS FOR PORTABLE FUEL CELLS AND OPERATING METHOD THEREOF

(75) Inventors: Jaeyoung Lee, Incheon (KR); Suk-Woo Nam, Seoul (KR); Tae Hoon Lim, Seoul (KR); In Hwan Oh, Seoul (KR); Sung Pil Yoon, Seongnam-si (KR); Seong Ahn Hong, Seoul (KR); Jonghee Han, Seoul (KR); Hyoung-Juhn Kim, Suwon-si (KR); Eun Ae Cho, Seoul (KR); Hyung Chul Hahm, Seoul (KR); Yeong Cheon Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 796 days.

(21) Appl. No.: 12/446,867

(22) PCT Filed: Dec. 8, 2006

(86) PCT No.: PCT/KR2006/005356
§ 371 (c)(1),
(2), (4) Date: Jun. 10, 2009

(87) PCT Pub. No.: WO2008/050933
PCT Pub. Date: May 2, 2008

(65) Prior Publication Data
US 2010/0021775 A1    Jan. 28, 2010

(30) Foreign Application Priority Data
Oct. 26, 2006    (KR) .................. 10-2006-0104568

(51) Int. Cl.
*H01M 8/04*    (2006.01)
*H01M 16/00*    (2006.01)

(52) U.S. Cl.
CPC ........ *H01M 16/006* (2013.01); *H01M 8/04559* (2013.01); *H01M 8/0494* (2013.01); *H01M 8/04947* (2013.01); *H01M 8/04955* (2013.01); *Y02E 60/50* (2013.01)
USPC .......................................... 429/429; 429/428

(58) Field of Classification Search
USPC ........................................................ 429/424
See application file for complete search history.

(56) References Cited

U.S. PATENT DOCUMENTS

| | | | |
|---|---|---|---|
| 4,961,151 | A | 10/1990 | Early et al. |
| 5,139,894 | A | 8/1992 | Mizuno et al. |
| 6,590,370 | B1 | 7/2003 | Leach |
| 6,777,909 | B1 | 8/2004 | Aberle et al. |
| 2004/0065489 | A1 | 4/2004 | Aberle et al. |

(Continued)

FOREIGN PATENT DOCUMENTS

| | | |
|---|---|---|
| DE | 10223117 A1 | 12/2003 |
| DE | 10355191 A1 | 3/2005 |

(Continued)

OTHER PUBLICATIONS

German Office Action corresponding to German Patent Application No. 112006004093.6, dated Aug. 31, 2011.

(Continued)

*Primary Examiner* — Ula C. Ruddock
*Assistant Examiner* — Jacob Marks
(74) *Attorney, Agent, or Firm* — Sughrue Mion, PLLC

(57) ABSTRACT

Disclosed are an apparatus for portable fuel cell and an operation method thereof, wherein stabilization state after initial operation can be determined using OCV.

7 Claims, 5 Drawing Sheets

(56) References Cited

U.S. PATENT DOCUMENTS

| | | |
|---|---|---|
| 2004/0142227 A1 | 7/2004 | Sugai et al. |
| 2005/0266280 A1* | 12/2005 | Ozeki et al. ............... 429/13 |
| 2006/0192523 A1 | 8/2006 | Nomoto |
| 2006/0210849 A1* | 9/2006 | Bono ............................. 429/22 |

FOREIGN PATENT DOCUMENTS

| | | |
|---|---|---|
| JP | 09139222 A | 5/1997 |
| JP | 2003229138 A | 8/2003 |
| JP | 2006156066 A | 6/2006 |
| KR | 10-2004-0008740 A | 1/2004 |
| KR | 1020040108740 A | 12/2004 |
| WO | 0134424 A1 | 5/2001 |
| WO | 2005004261 A2 | 1/2005 |

OTHER PUBLICATIONS

Decision on Rejection issued in corresponding Japanese Patent Application No. 2009-534470 dated Oct. 1, 2013.

* cited by examiner

APPARATUS FOR PORTABLE FUEL CELLS AND OPERATING METHOD THEREOF

TECHNICAL FIELD

The present invention relates to a whole fuel cell apparatus (referred hereinafter as "apparatus for portable fuel cell") for power supply of portable electronic appliances, including a secondary battery, a fuel cell, and a power regulator, and more particularly to an apparatus for portable fuel cell wherein smooth initial operating is possible, energy losses can be minimized, and as well stable and efficient energy management is possible, and an operating method thereof.

BACKGROUND ART

An apparatus for portable fuel cell is used as a power source having output ranging from W level to kW level (e.g., 1 W~5 kW) in various appliances, such as mobile phones, notebook computers, (industrial or military) humanoid robots, emergency power sources, electric wheelchairs, military communication devices, or the like. As a fuel cell directly applicable to such apparatus for portable fuel cell, there is a modified hydrogen fuel cell (using methanol, diesel, natural gas, or the like), a direct liquid fuel cell (using methanol, formic acid, ethanol, dimethylether, methylformate, borohydrides, or the like), a hydrogen fuel cell using a hydrogen storage tank, or others.

However, the conventional development has been mainly focused on an appliance itself to which the apparatus for portable fuel cell is applicable as a power source, or an appearance after the apparatus for portable fuel cell has been installed. Like this, as a result of such prior research for the peripheral things other than the apparatus for portable fuel cell itself, there has been, in fact, hardly studied a research for energy management required for commercialization of the apparatus for portable fuel cell.

In particular, there has been no ideas to minimize losses of energy produced from the apparatus for portable fuel cell, to implement stable and efficient energy management, and to consider selection and arrangement of the components in the apparatus for portable fuel cell in view of such energy management.

DISCLOSURE

Technical Problem

Accordingly, the present invention has been made to solve the above mentioned problems, and an object of the present invention is to provide an apparatus for portable fuel cell and an operating method thereof, wherein losses of energy produced from the apparatus for portable fuel cell can be minimized, stable and efficient energy management can be implemented, and selection and arrangement of the components in the apparatus for portable fuel cell can be carried out in view of such energy management.

Technical Solution

There is provided an apparatus for portable fuel cell comprising: a fuel cell comprising a unit cell or a stack of the unit cells; a secondary battery which is chargeable and dischargeable; and a power management system (PMS) having a DC-DC converter, the PMS receiving power produced from the fuel cell and supplying the power to an appliance, being connected with the secondary battery to receive or supply power, supplying power for operating the fuel cell, measuring voltage of the fuel cell and regulating power supply based on the measurement, wherein the PMS is supplied with power from the fuel cell at a stabilization state that voltage measured from the fuel cell reaches a constant state after initial operation of the fuel cell.

In an embodiment of the invention, the PMS measures whether or not the voltage of the fuel cell exceeds an open-circuit voltage (OCV) value of the unit cell or the stack thereof when the voltage of the fuel cell is elevated upon the initial operating, and after a time, whether or not the voltage of the fuel cell reaches the OCV value again, and is supplied with the power from the fuel cell after the two times measurement.

In an embodiment of the invention, when the voltage reaches within ±5% of OCV value after the time, the PMS determines that the voltage reaches the OCV value, and is supplied with power from the fuel cell.

In an embodiment of the invention, the secondary battery supplies the power of 10 to 15% of the total power produced from the fuel cell as initial operating power of the fuel cell.

In an embodiment of the invention, the consumed power of the secondary battery for the initial operating power of the fuel cell is supplied from the PMS until the completion of its full charging, and then the connection between the PMS and the secondary battery is cut off.

In an embodiment of the invention, when the fuel cell reaches its performance degradation stage after its normal operation state so that the potential thereof reaches below limit potential, the PMS stops power supplying to the fuel cell so as to stop the operating of the fuel cell, and is supplied with power from the secondary battery.

In an embodiment of the invention, the PMS keeps the operation potential of the fuel cell at 40 to 60% of use potential of the appliance so as to maintain the efficiency of the DC-DC converter to be 85 to 90% or more.

In an embodiment of the invention, the number of separators and an area of MEA of the fuel cell are controlled so that the operation potential does not exceed 60%.

There is provided a method of operating an apparatus for portable fuel cell, wherein the apparatus for portable fuel cell comprises a fuel cell comprising a unit cell or a stack of the unit cells; a secondary battery which is chargeable and dischargeable; and a power management system (PMS) having a DC-DC converter, the PMS receiving power produced from the fuel cell and supplying the power to an appliance, being connected with the secondary battery to receive or supply power, supplying power for operating the fuel cell, measuring voltage of the fuel cell and regulating power supply based on the measurement, the method comprising the steps of: supplying initial operation power from the secondary battery to the fuel cell (S1); supplying power from the fuel cell to the PMS at a stabilization stage that voltage measured from the fuel cell reaches a constant state after initial operating of the fuel cell (S2); supplying power from the PMS, which is supplied with power, to an appliance, the fuel cell, and the secondary battery (S3); and stopping power supplying from the secondary battery to the fuel cell when the power is supplied from the PMS to the fuel cell (S4).

In an embodiment of the invention, the PMS measures whether or not the voltage of the fuel cell exceeds an open-circuit voltage (OCV) value of the unit cell or the stack thereof when the voltage of the fuel cell is elevated upon the initial operating, and after a time, whether or not the voltage of the fuel cell reaches the OCV value again, and is supplied with the power from the fuel cell after the two times measurement.

In an embodiment of the invention, in the step S2, when the voltage reaches within ±5% of OCV value after the time, the PMS determines that the voltage reaches the OCV value, and is supplied with power from the fuel cell.

In an embodiment of the invention, in the step S1, the secondary battery supplies the power of 10 to 15% of the total power produced from the fuel cell as initial operating power of the fuel cell.

In an embodiment of the invention, in the step S3, the secondary battery is charged with surplus power that is left after the power is supplied to the appliance and the fuel cell.

In an embodiment of the invention, the PMS keeps the operation potential of the fuel cell at 40 to 60% of use potential of the appliance so as to maintain the efficiency of the DC-DC converter to be 85 to 90% or more.

In an embodiment of the invention, the number of separators and an area of MEA of the fuel cell are controlled so that the operation potential does not exceed 60%.

In an embodiment of the invention, the method further comprises the step of: stopping power supplying from the PMS to the secondary battery, upon the full charging of the secondary battery (S5).

In an embodiment of the invention, the method further comprises the step of: stopping power supplying from the PMS to the fuel cell so as to stop the operating of the fuel cell, and allowing the PMS to be supplied with power from the secondary battery, when the fuel cell reaches its performance degradation stage after its normal operation state so that the potential thereof reaches below limit potential (S6).

Advantageous Effects

According to the present invention, by means of initial operating detection, efficient conversion of operating potential, minimum use of fuel concentration in a fuel cell, maximum use of a secondary battery upon the stoppage of the operation of the fuel cell, etc., it is possible to minimize losses of energy produced and to carry out stable and efficient energy management. In addition, by means of selection and arrangement of the components in the apparatus for portable fuel cell in view of such energy management, it is possible to increase economy and availability of the apparatus for portable fuel cell.

In particular, in the present invention, since determining the initial operating based on the open-circuit voltage (OCV) has reliability of 95% or more, it is stably controlled to have optimum operating potential and minimum energy losses, thereby keeping the performance of the apparatus for portable fuel cell constant.

Furthermore, the apparatus for portable fuel cell of the present invention can be used not only for the apparatus for portable fuel cell but also for optimum power management in various kinds of fuel cell systems.

MODE FOR INVENTION

Hereinafter, an apparatus for portable fuel cell and an operating method thereof according to the embodiments of the present invention will be described in detail.

In the context, "fuel cell" can be referred to that it also comprises a fuel supply unit, a fuel supply pump, a gas supply pump, a cooling fan, a BOP, etc., which are generally accompanied by fuel cell, as well as unit cell or stack of the unit cells.

Figure 1:
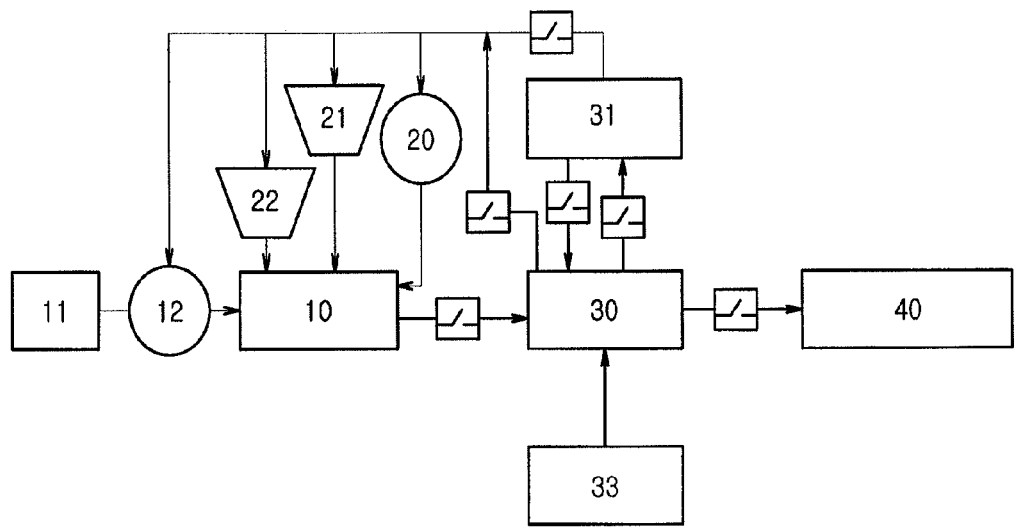
FIG. 1 is a schematic view of structure of an apparatus for portable fuel cell according to an embodiment of the present invention.

FIG. 1 is a schematic view of structure of an apparatus for portable fuel cell according to an embodiment of the present invention.

As illustrated in FIG. 1, the apparatus for portable fuel cell according to an embodiment of the invention includes a fuel cell 10 consisting of a unit cell or a stack of the unit cells, a chargeable, dischargeable secondary battery 31, and a power management system (PMS) 30 for managing power supply in the apparatus. The PMS receives power (voltage-current) produced from the fuel cell 10 and supplies it to an appliance 40 or the secondary battery 31, or receives power again from the secondary battery 31. The PMS includes a DC-DC converter (not shown) and a voltmeter (not shown) for measuring a voltage of the fuel cell 10 in real time. Herein, the PMS 30 controls a voltage value corresponding to the specification of the appliance 40 connected to the apparatus for portable fuel cell, or corresponding to the parts (a liquid pump 12, a gas pump 20, a cooling fan 21, a BOP 22, or the like) in the apparatus for portable fuel cell. The DC-DC converter in the PMS 30 enhances the produced energy suitably to a target voltage.

The fuel cell 10 is provided with general devices which can be provided to fuel cell. That is, the fuel cell 10 includes a fuel storage unit 11, a fuel supply pump 12 for supplying fuel from the fuel storage unit 11 to the fuel cell 10 composed of a unit cell or a stack of the unit cells, an air pump 20 for supplying air to the fuel cell 10, a cooling fan 21 for cooling the fuel cell 10, a BOP 22 connected to the fuel cell 10, and the like.

The air pump 20, the cooling fan 21, and the BOP 22 are operated using power supplied first from the secondary battery 31 so that the fuel cell 10 is operated to produce electric power. As the secondary battery 31, secondary battery having super smaller capacity of e.g., 5V DC, 12V DC, or 21V DC can be used. Although the capacity can be changed according to the production power of fuel cell, the capacity corresponding to approximately 10-15% of the total power can be preferably used.

For example, optimum energy requirement of the parts (liquid pump 12, gas pump 20, etc.) for operating 30 Whr fuel cell 10 is approximately 6 W, and in the case where stabilization time is set to below 10 minutes, the secondary battery 31 of approximately 1 Whr (which corresponds to approximately 3% of output per hour/0.3% of the total output) is required. For reference, in case of a recently developed fuel cell for notebooks, the output per hour is from 20 to 30 Whr, and the total output is approximately 300 W.

As described later, consumed power of the secondary battery 31 is charged with surplus power of the power to be used in the appliance 40, and when the secondary battery is fully charged, the power is continuously consumed only by the connection between the battery and the appliance so that the connection is cut off to prevent the energy efficiency from reducing.

Power switches are provided between the fuel cell 10 and the secondary battery 31 and the PMS 30, or between the secondary battery 31 and the air pump 20, the cooling fan 21, and the BOP 22, or between the air pump 20, the cooling fan 21, and the BOP 22 and the PMS 30 to turn on/off the current flow, and the switches are controlled to turn on/off by the PMS 30.

Meanwhile, a capacitor 33 can be additionally provided to the PMS 30 in order to consider the energy supply to the appliance 40 according to dynamic energy consumption of the appliance 40.

Figure 2:
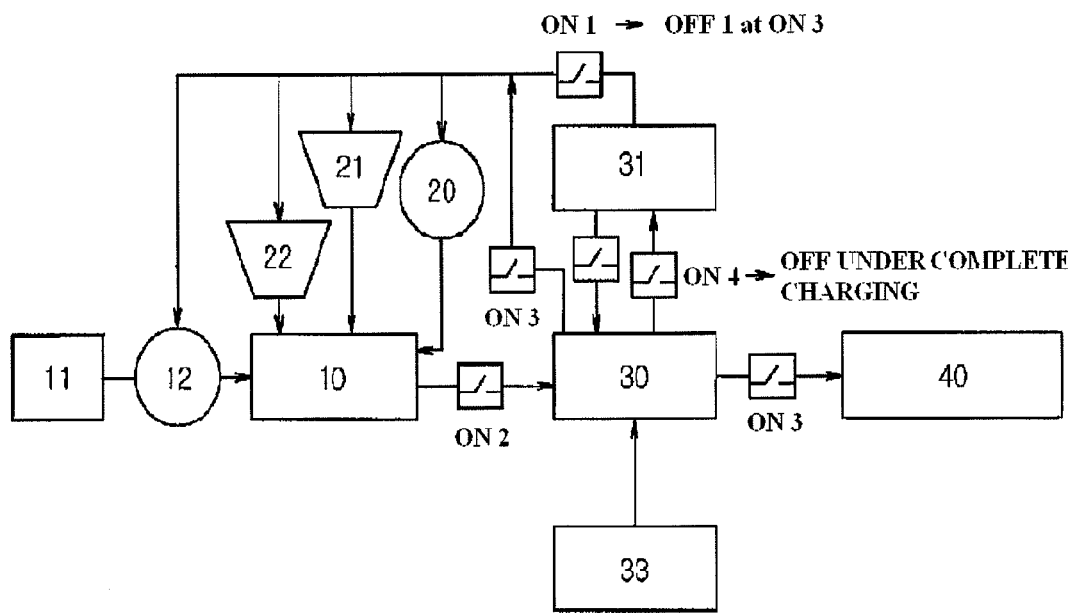
FIG. 2 is a view illustrating an operation of an apparatus for the portable fuel cell in their initial operation state and normal operation state in an embodiment of the invention.

FIG. 2 is a view illustrating an operation of an apparatus for the portable fuel cell in their initial operation state and normal operation state in an embodiment of the invention.

In FIG. 2, as described above, initial power is supplied from the secondary battery 31 to the parts 12, 20, 21, and 22 to operate the fuel cell 10. Herein, "on 1" of switch denotes the power supply. Such initial power supply is stopped in case of "on 3" condition (i.e., "on 1" is switched into "off 1").

Upon the production of power by operating the fuel cell 10, the produced power is supplied to the PMS 30. Herein, initially produced power is not supplied directly, but the power is supplied from the fuel cell 10 to the PMS 30 in case of a stabilization state (described further in detail below) in which voltage measured from the fuel cell 10 becomes constant after the initial operating. Herein, "on 2" denotes the power supply.

Meanwhile, the PMS 30 supplies power received from the fuel cell 10 to the appliance 40, the secondary battery 31, and the parts 12, 20, 21, and 22. Herein, the power supply is denoted as "turn on 3" and "turn on 4" of the switch. Upon the completion of charging in the secondary battery 31, the power supplied to the secondary battery 31 is cut off (i.e., "turn on 4" is switched into "turn off 2"). After the full charging of the secondary battery 31, when the PMS 30 is connected to the secondary battery 31 (i.e., not being into "turn off 2"), the energy efficiency of the whole apparatus for portable fuel cell can be reduced due to a phenomenon that a certain amount of energy is consumed.

An important fact in the above operating is how the initial stabilization state is determined.

Figure 3:
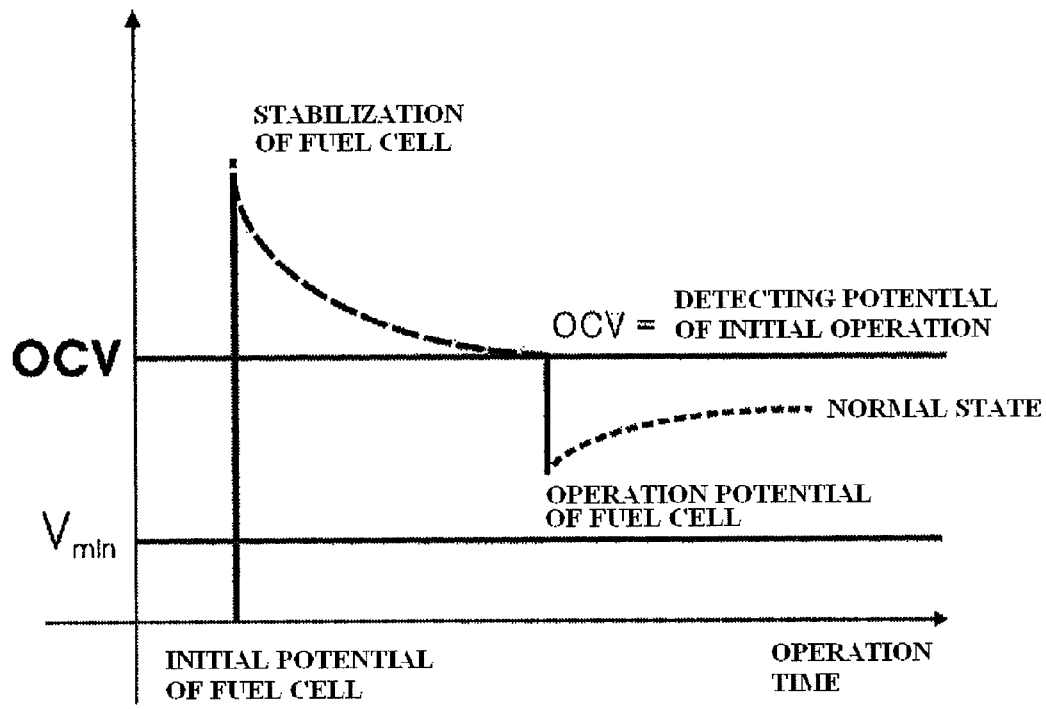
FIG. 3 is a graphical diagram illustrating variation of fuel cell potential according to operating time in an initial operation state and a normal operation state in an embodiment of the invention.

FIG. 3 is a graphical diagram illustrating variation of fuel cell potential according to operating time in an initial operation state and a normal operation state in an embodiment of the invention.

As illustrated in FIG. 3, while fuel and air are supplied, the output potential of the fuel cell is elevated from 0V to a maximum point (e.g., 11V or less in case of a direct liquid fuel cell system using 15 sheets of bipolar plate separators), and then the output potential is gradually stabilized.

However, generally, the unit cell or the stack thereof in the fuel cell 10 is stabilized after a constant time, and the stabilization time can be varied according to specification and output range of the unit cell or the stack thereof.

Thus, it is not suitable that the stabilization of the operation of the fuel cell 10 is determined based on time concept, and even in case of the consideration of the experimental value, the unstable state of the fuel cell 10 may be caused, and the dynamical operation of the appliance 40 may be problematic.

Thus, it is preferable that the stabilization state is determined by checking OCV that the unit cell or the stack thereof can show.

In specific, OCV, which the unit cell or the stack thereof can indicate, is measured in advance and is input to the PMS 30. The PMS 30 detects voltage of the fuel cell 10 in real time. Further, when voltage is elevated from 0V upon the initial operating, PMS 30 checks whether the voltage exceeds the OCV value, and after a certain time, PMS 30 checks again whether the voltage reaches the OCV value. To this end, when the OCV value is checked two times, the PMS 30 is set to be supplied with power from the fuel cell 10.

Meanwhile, since the invention uses the OCV value which is the stabilization state value, upon the secondary voltage measurement for detecting whether the voltage reaches the OCV value, the PMS does not use an absolute value for voltage, but the PMS determines that the voltage reaches the OCV value if the voltage is detected to be within ±5% of the OCV value, thereby operating the fuel cell 10.

In case of the direct liquid fuel cell coupled with 15 sheets of bipolar plate separators, the OCV of each separator is 0.5~0.75V. Thus the total potential of 7.5~11.25V corresponding to 15 sheets of the separators becomes detected two times.

Herein, as described above, the power output from the fuel cell 10 is supplied to the parts, such as the BOP 22, via the PMS 30, and at the same time, charges the discharged secondary battery 31. After completion of full charging of the secondary battery 31, the power source connected is cut off.

Figure 4:
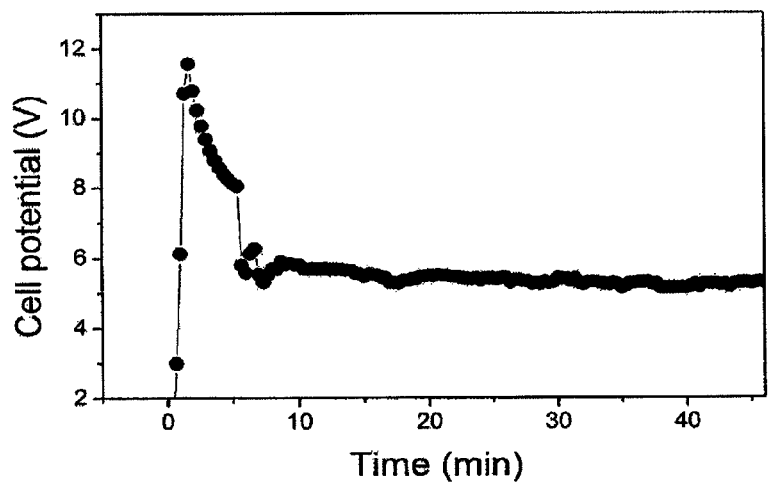
FIG. 4 is a graphical diagram illustrating a detected response time result of an apparatus for portable fuel cell in an initial operating state and a normal operation state in an embodiment of the invention.

FIG. 4 is a graphical diagram illustrating a detected response time result of an apparatus for portable fuel cell (voltage change of direct liquid fuel cell using 15 sheets of the separators) in an initial operating state and a normal operation state in an embodiment of the invention.

As seen from FIG. 4, the voltage is elevated from 0V to approximately 11.7V while fuel and air are supplied, and reaches a stabilization stage within about 5 minutes.

The OCV of the direct liquid fuel cell using 15 sheets of separators is approximately 8.0V, and as shown in FIG. 4, when the OCV of the real stack of the fuel cell 10 reaches 8V, current is output to begin an operation.

Like this, the present invention carries out operation considering whether an initial stabilization is obtained. To determine the initial stabilization based on absolute time may cause a problem in that stability of the apparatus and efficient use of fuel as well as minimization of energy losses of the whole apparatus are not satisfied because respective states and conditions of the unit cells or the stack are not considered. Therefore, it is preferable that whether an initial stabilization is obtained be determined using OCV.

Figure 5:
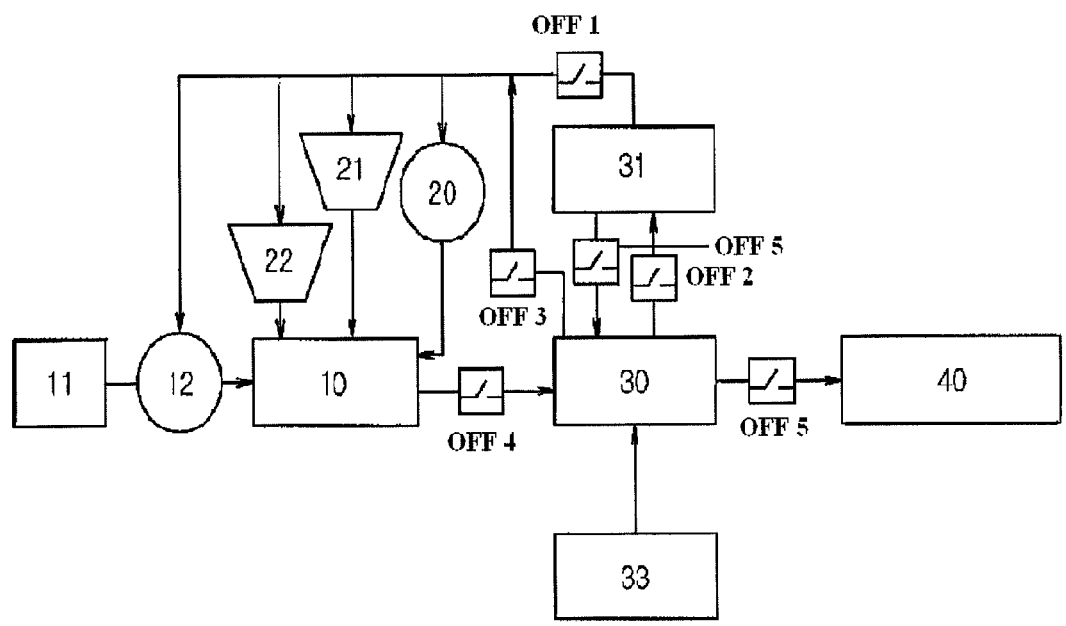
FIG. 5 is a schematic view illustrating the operation (performing minimum power management) of an apparatus for portable fuel cell in the stage of performance degradation of the fuel cell after a normal operation state in an embodiment of the invention.
Figure 6:
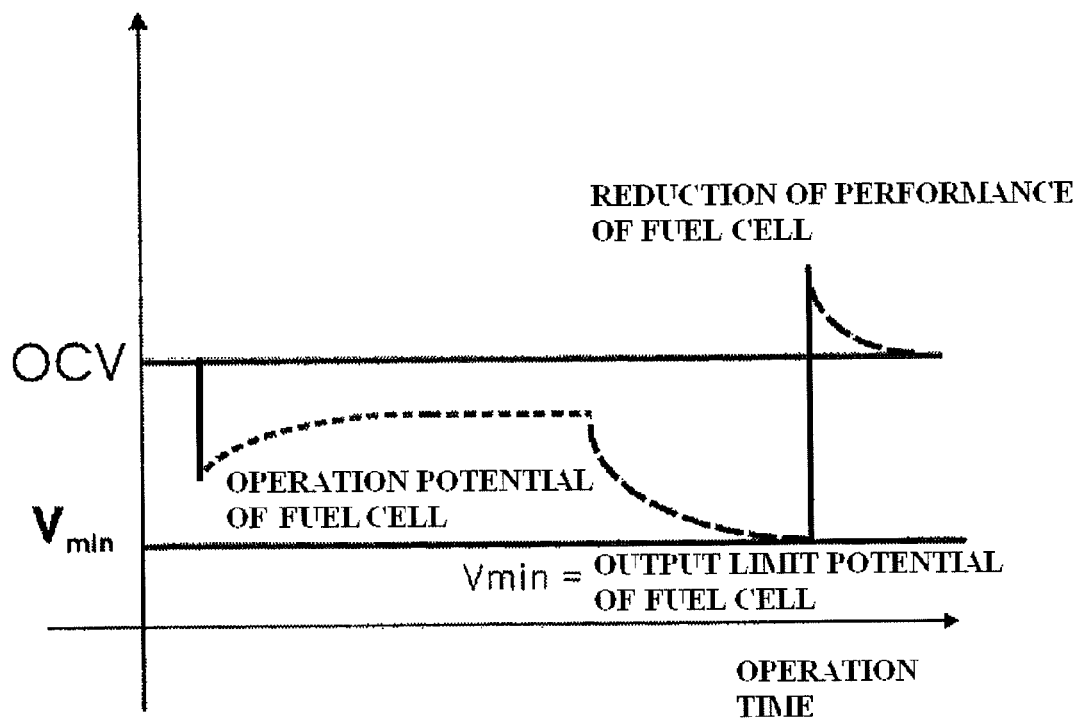
FIG. 6 is a graphical diagram illustrating variation of fuel cell potential according to operating time in the stage of fuel cell performance degradation after a normal operation state in an embodiment of the invention.

FIG. 5 is a schematic view illustrating the operation (performing minimum power management) of an apparatus for portable fuel cell in the stage of performance degradation of the fuel cell after a normal operation state in an embodiment of the invention. FIG. 6 is a graphical diagram illustrating variation of fuel cell potential according to operating time in the stage of fuel cell performance degradation after a normal operation state in an embodiment of the invention.

Referring first to FIG. 6, FIG. 6 illustrates that the operating potential of the fuel cell is degraded in its performance after a normal operation state, thereby reaching output limit potential Vmin of the fuel cell.

This means that while fuel supplied from the fuel supply 11 via a concentration adjuster is continuously consumed, 90~95% or more of initial chemical energy (i.e., energy density) of fuel cell is consumed (mass transfer limit phenomenon) so that the performance of the fuel cell 10 is degraded. In addition, such abrupt reduction in operation potential may be caused from deterioration of a catalyst, a polymeric membrane, a separator and an electrode due to long-term use and dynamical operating.

Referring to FIG. 5, when the output potential of the fuel cell 10 reaches limit potential, the power output of the fuel cell 10 is cut off. Herein, the switch is denoted as "on 4". Further, in this case, it needs not the operating of the fuel cell 10, so that the PMS 30 controls the operation of BOP 22 to be stopped, which is operating the fuel cell 10. Herein, the switch is denoted as "off 3". The operation at the limit potential or less means the operation in case of the supply of low concentration fuel or the operation of the stack at high current density, so that there may be caused a problem in stability and endurance of the fuel cell 10.

In addition, the stoppage in the operation of the BOP 22 for managing the operating of the fuel cell 10 at limit potential is to maximize energy utilization of the secondary battery 31. That is, even when further power output from the fuel cell 10 does not occur any more, if the BOP 22 is operated, the lifetime of the secondary battery 31 used for initial operating and fuel substitution can be reduced.

Meanwhile, the operation is stopped for fuel re-supply and checking of the fuel cell 10. Herein, the secondary battery 31 is in charge of the power for operating the appliance 40 (denoted as "on 5"). In case where fuel is simply re-supplied, the time for re-supply is 5 minutes or less, which does not cause any problem in re-operating the whole apparatus.

Figure 7:
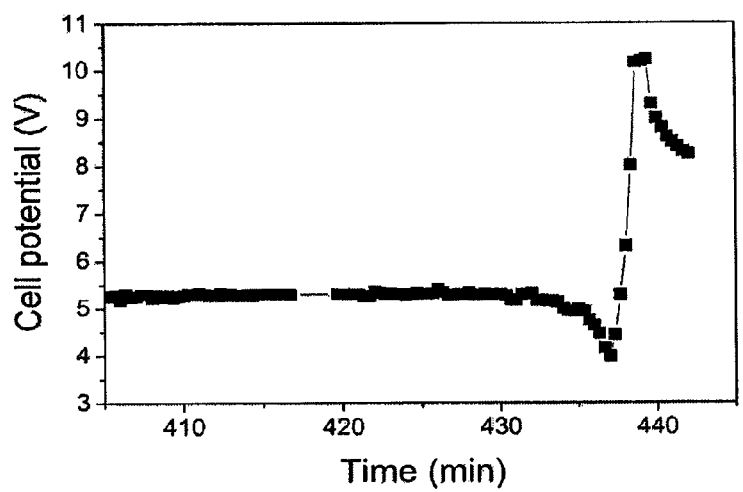
FIG. 7 is a graphical diagram illustrating a detected response time result of an apparatus for portable fuel cell in the stage of performance degradation of the fuel cell after a normal operation state in an embodiment of the invention.

FIG. 7 is a graphical diagram illustrating a detected response time result of an apparatus for portable fuel cell in the stage of performance degradation of the fuel cell after a normal operation state in an embodiment of the invention.

As shown in FIG. 7, while the operation time becomes longer, the concentration of the fuel cell is reduced and the operating potential of 5.3V reaches limit potential of 4.0V. Then, the potential reaches maximum potential and then the stabilization stage of 8.0V.

Figure 8:
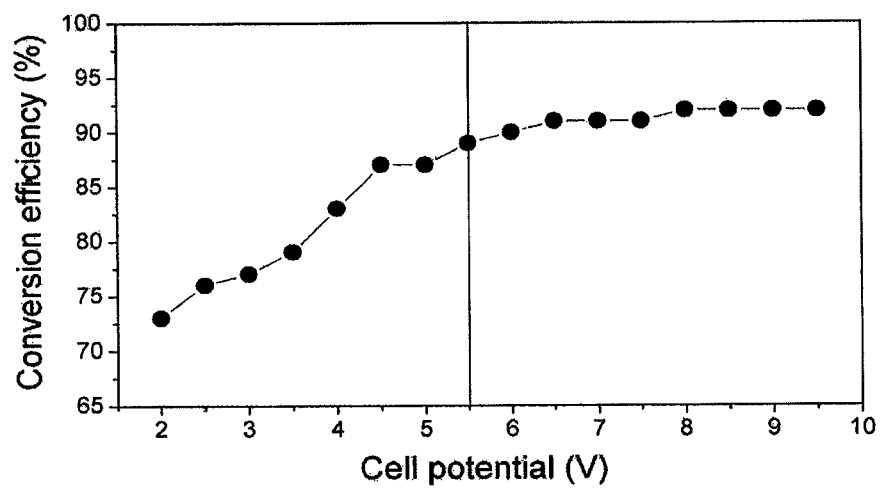
FIG. 8 is a graphical diagram illustrating efficiency of a DC-DC converter according to input potential in an apparatus for portable fuel cell according to an embodiment of the invention.

FIG. 8 is a graphical diagram illustrating efficiency of a DC-DC converter according to input potential in an apparatus for portable fuel cell according to an embodiment of the invention.

To make the efficiency of the DC-DC converter above 85%~90%, i.e., to minimize the energy losses, the fuel cell should secure operation potential of 40~60% of the use potential of the appliance. For example, most of portable fuel cell devices is operated while the appliance is in 12V DC. Herein, the operation potential of the direct liquid fuel cell using 15 sheets of separators is made to be approximately from 4.8 to 7.2V. The efficiency of elevating voltage from a level of operating potential below 40%, e.g., 4V to 12V is 80% or less. Meanwhile, in case of using the fuel cell 10 having operating potential of 5.5V, the energy loss is 10%, which is on the very small level. Further, when the potential of 60% or more, e.g., 7.5V or more is secured, the efficiency is increased, but the number of separators to be stacked and the area of MEA should be increased, which is not preferable.

Therefore, the number of the separators and/or the area of MEA should be determined in consideration of the amount of such energy loss. For example, in the case of a hydrogen fuel cell using, e.g., modified hydrogen, when about 10 sheets of the separators are used, the operating potential can be maintained to be 6V or more.

INDUSTRIAL APPLICABILITY

The present invention relates to a whole fuel cell apparatus for power supply of portable electronic appliances, which includes a secondary battery, a fuel cell and a power regulator.

The invention claimed is:

1. An apparatus for portable fuel cell comprising:
a fuel cell comprising a unit cell or a stack of the unit cell;
a secondary battery which is chargeable and dischargeable, and connected to the fuel cell to supply an initial power to the fuel cell; and
a power management system (PMS) having a DC-DC converter and being connected with the secondary battery to receive or supply power, and being connected with the fuel cell to receive power or supply power, and being connected with an appliance to supply power,
wherein the PMS is programmed to measure voltage of the fuel cell and regulate power supply based on the measurement,
wherein the PMS is programmed to be supplied with power from the fuel cell at a stabilization state that voltage measured from the fuel cell reaches a constant state after initial operation of the fuel cell using the initial power from the secondary battery,
wherein the PMS is programmed to measure whether or not the voltage of the fuel cell exceeds an open-circuit voltage (OCV) value of the unit cell or the stack thereof when the voltage of the fuel cell is elevated upon the initial operating is measured by the PMS, and after a time, whether or not the voltage of the fuel cell reaches the OCV value again, and to be supplied with power from the fuel cell after the two times measurement, and when the voltage reaches within ±5% of OCV value after the time, it is determined that the voltage reaches the OCV value.

2. The apparatus for portable fuel cell of claim 1, wherein when the voltage reaches within ±5% of OCV value after the time, the PMS determines that the voltage reaches the OCV value, and is supplied with power from the fuel cell.

3. The apparatus for portable fuel cell of any one of claims 1 and 2, wherein the secondary battery supplies the power of 10 to 15% of the total power produced from the fuel cell as initial operating power of the fuel cell.

4. The apparatus for portable fuel cell of any one of claims 1 and 2, wherein the consumed power of the secondary battery for the initial operating power of the fuel cell is supplied from the PMS until the completion of its full charging, and then the connection between the PMS and the secondary battery is cut off.

5. The apparatus for portable fuel cell of any one of claims 1 and 2, wherein when the fuel cell reaches its performance degradation stage after its normal operation state so that the potential thereof reaches below limit potential, the PMS stops power supplying to the fuel cell so as to stop the operating of the fuel cell, and is supplied with power from the secondary battery.

6. The apparatus for portable fuel cell of any one of claims 1 and 2, wherein the PMS keeps the operation potential of the fuel cell at 40 to 60% of use potential of the appliance so as to maintain the efficiency of the DC-DC converter to be 85 to 90% or more.

7. The apparatus for portable fuel cell of claim 6, wherein the number of separators and an area of MEA of the fuel cell are controlled so that the operation potential does not exceed 60%.

* * * * *